Aug. 25, 1936.  T. F. THOMPSON  2,051,917
TRANSMISSION CONTROL
Filed July 1, 1935  2 Sheets-Sheet 1

INVENTOR.
~T. F. Thompson~
BY
M. Talbert Dick
ATTORNEY.

Aug. 25, 1936.   T. F. THOMPSON   2,051,917
TRANSMISSION CONTROL
Filed July 1, 1935   2 Sheets-Sheet 2

INVENTOR.
T. F. Thompson
BY
ATTORNEY.

Patented Aug. 25, 1936

2,051,917

UNITED STATES PATENT OFFICE 2,051,917

TRANSMISSION CONTROL

Theodore F. Thompson, Des Moines, Iowa

Application July 1, 1935, Serial No. 29,286

7 Claims. (Cl. 74—472)

The principal object of my invention is to provide an easy actuatable control mechanism for automotive vehicle transmissions and although the same may be successfully used in conjunction with all multiple speed transmissions it is particularly designed for use with a transmission such as disclosed in my co-pending application on a Semi-automatic positive transmission, filed January 16, 1935, Serial No. 2047.

A further object of my invention is to provide a transmission control that will, after the transmission has been placed in "low" gear, progressively place the transmission to which it is attached in "intermediate" and then into "high" gear by the mere actuating of the vehicle foot carburetor feed.

A still further object of this invention is to provide a transmission control that either increases or decreases the gear ratio of the transmission as and when desired by the operator of the vehicle.

A still further object of my invention is to provide a semi-automatic transmission control that is always under the definite control of the operator of the vehicle, is economical in manufacture, and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Figure 1:
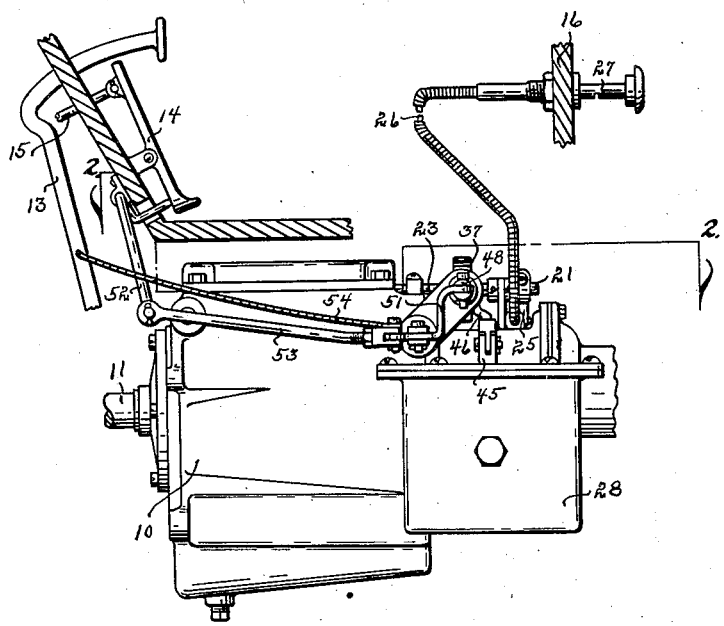
Fig. 1 is a side view of my transmission control installed on a transmission and ready for use.

Referring to each of the figures in detail, I have used the numeral 10 to designate the housing of a transmission. Extending into this housing is the usual drive shaft 11 designed to be operatively connected to a prime mover. The numeral 12 designates the driven shaft exiting from the transmission inside the transmission housing 10. Such transmissions are usually found in automotive vehicles with the shaft 11 connected to the motor and the shaft 12 operatively connected to the traction wheels.

Figure 2:
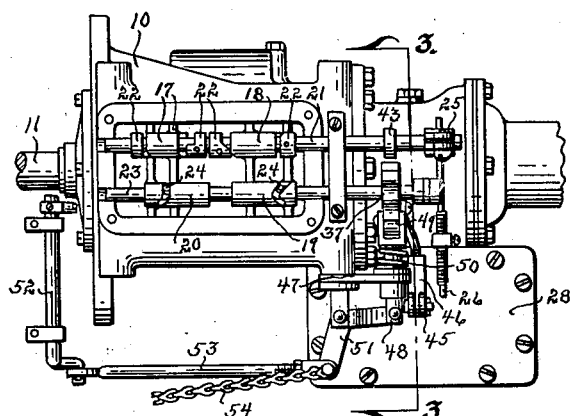
Fig. 2 is a top plan view of my control mechan'sm installed on a transmission with certain parts cut away and taken on line 2—2 of Fig. 1.
Figure 3:
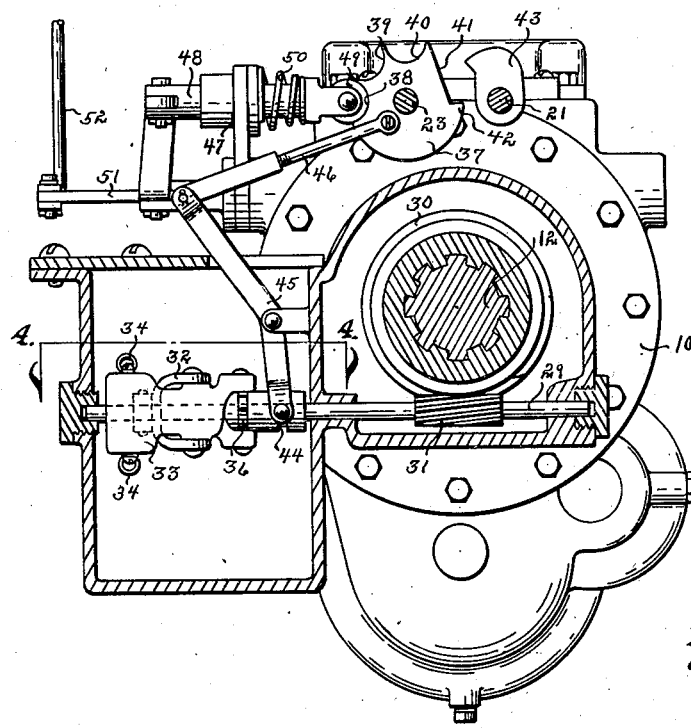
Fig. 3 is a rear end view of a transmission showing my control mechanism installed thereon and with certain sections cut away and taken on line 3—3 of Fig. 2.

All such automotive vehicles have a clutch pedal 13, a carburetor foot feed pedal 14, with a rod 15 extending to the carburetor and an instrument board 16. Practically all transmissions now being used have a "neutral", "low", "intermediate", "high", and "reverse" gear. In the drawings, I have used the numeral 17 to designate the "low" actuating element of the transmission, the numeral 18 to designate the "reverse" actuating element of the transmission, the numeral 19 to designate the "intermediate" actuating element of the transmission, and the numeral 20 to designate the "high" actuating element of the transmission. The elements 17 and 18 have their upper ends loosely embracing the shaft 21 and are moved forwardly or rearwardly by cams 22 rigidly secured to the shaft 21 and which are operated by the rotation of the shaft 21. The elements 20 and 21 have their upper ends rotatably and slidably mounted on the shaft 23 and are reciprocated rearwardly or forwardly by having cam grooves slidably engaging pins 24 on the shaft 23 when the shaft 23 is rotated. Obviously, any desired method of having the shafts 21 and 23 actuate the transmission may be used with certain positions of rotation of the shafts placing the transmission in "neutral". In Figs. 1, 2, and 3, the transmission is shown in "neutral" gear.

I will now explain the parts and operation of my control as applied to such a transmission, its auxiliary parts, and certain of the control parts of the vehicle having the transmission. The numeral 25 designates a downwardly extending arm having its upper end rigidly secured to the shaft 21. The numeral 26 designates a flexible cable having one end connected to the lower end portion of the member 25 and its other end connected to the "push-and-pull" hand lever 27, as shown in the drawings.

Figure 6:
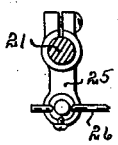
Fig. 6 is a rear end view of a portion of the manually controlled part of my device for manually placing the transmission in "neutral", "low", or "reverse".

By this arrangement when the manually actuated handle member 27 is in a position as shown in Fig. 1 the shaft 21 will be in a position as shown in Fig. 2 and the transmission will be in a condition of "neutral". The elements 17 and 18 and cam members 22 are so positioned on the shaft 21 and in relation to each other, however, that when the handle member 27 is manually pulled completely to the rear the shaft 21 will be rotated to the right, thereby moving the element 17 and placing the transmission in "low" gear, and when the handle member 27 is forced completely forwardly the shaft 21 will be rotated to the left, thereby moving the element 18 and placing the transmission in "reverse" gear. By moving the handle member 27 half way in or half way out the member 25 will be in a position as shown in Fig. 6 and the elements 17 and 18 will be reciprocated to a position as shown in Fig. 2, and the transmission will be in "neutral".

Figures 4, 5:
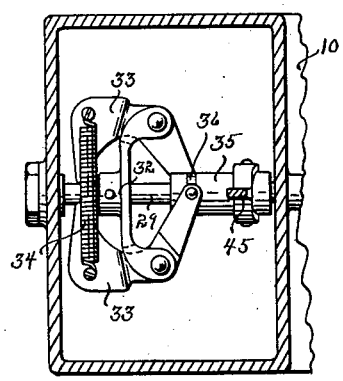
Fig. 4 is a top plan view of the governor used in my transmission control.
Fig. 5 is a rear end view of a portion of my control for positively holding a transmission in definite predetermined speeds.

I have used the numeral 28 to designate my governor housing. The numeral 29 designates the governor shaft rotatably mounted in the governor housing and extending into the housing 10 of the transmission. The numeral 30 designates a worm gear splined on the shaft 12. The numeral 31 designates a driven worm gear rigidly secured on the shaft 29 and in engagement with the worm gear 30. By this construction when the shaft 11 is rotating and the transmission is not in "neutral" gear, the rotating shaft 12 will rotate the governor shaft 29. The numeral 32 designates the base portion of my governor rigidly secured on the shaft 29 and inside the governor housing 28. The numeral 33 designates governor weights each pivoted between their two ends to the governor portion 32 as shown in Fig. 4. The free and weighted ends of these members 33 are yieldingly held in a contracted position and toward each other by coil springs 34.

The numeral 35 designates a sleeve slidably and rotatably mounted on the shaft 29 and inside the governor housing. The numeral 36 designates a peripheral groove in the sleeve 35. This groove is operatively engaged by the fixed or non-weighted ends of each of the members 33, as shown in Fig. 4. From this, it will readily be seen that when the shaft 29 is rotated the weighted ends of the members 33 will move outwardly by centrifugal force and against the action of the springs 34 and move the sleeve 35 toward the fixed portion 32 of the governor. The amount of reciprocation of the sleeve 35 will be in direct ratio to the speed of rotation of the shaft 29 provided there is nothing to interfere with its reciprocation. If the shaft 29 is not rotating the springs 34 will close the governor and thereby move the sleeve 35 away from the member 32 to a position shown in Fig. 4.

The numeral 37 designates a plate member rigidly connected on the shaft 23. This member 37 has three closely positioned circular depressions 38, 39, and 40 in its periphery as shown in Fig. 3 and Fig. 5. This member 37 also has a flat portion 41 on its periphery in close proximity to the depression 40. The numeral 42 designates a hook portion on the periphery of the member 37 in close proximity to the flat portion 41, as shown in Fig. 5. The numeral 43 designates a hook lug rigidly secured on the shaft 21 and capable of engaging the flat portion 41 and hook portion 42 of the member 37 at times when the shaft 21 is rotated to the left. The numeral 44 designates a second peripheral groove in the sleeve 35. The numeral 45 designates an arm pivotally mounted near its center and having its lower end operatively engaging the peripheral groove 44. The numeral 46 designates a link having one end pivoted to the upper end of the arm 45 and its other end pivoted to the face of the member 37 at a point in a plane below the plane of the shaft 23, as shown in Fig. 3.

By this arrangement when the sleeve 35 is reciprocated the shaft 23 will be accordingly rotated. The elements 19 and 20 are so positioned on the shaft 23 and so engage the members 24 that when the shaft 23 is rotated to the right from its position shown in Fig. 3 the element 19 will first place the transmission in "intermediate" gear and by further rotation of the shaft 23 the element 20 will place the transmission in "high" gear. The numeral 47 designates a bearing member. The numeral 48 designates a shaft slidably mounted in the bearing member 47. The numeral 49 designates a wheel rotatably mounted on one end of the shaft 48 capable of entering and engaging any one of the depressions 38, 39, or 40. The numeral 50 designates a coil spring having one end engaging the bearing member 47 and its other end operatively engaging the shaft 48 for yieldingly holding the wheel 49 in one of the depressions 38, 39, or 40. Obviously, with the wheel 49 so held in engagement with any one of these depressions the member 37 will be held against rotation. The numeral 51 designates an angle arm pivotally mounted near its center and having one of its ends pivotally attached to the end of the shaft 48 opposite from the wheel 49. The numeral 52 designates a crank arm rotatably mounted near its center and having one of its ends capable of being engaged by the carburetor foot feed lever 14, as shown in Fig. 1. The numeral 53 designates a connecting rod having one end pivoted to the other end of the crank arm 52 and its other end pivoted to the outer end of the angle arm 51, as shown in Fig. 2. By using a foot feed lever as shown in Fig. 1, with its center portion pivotally secured and its upper end operatively secured to the carburetor, the crank arm 52 may be so positioned that the lower end portion of the lever 14 is capable of engaging the crank arm.

When this construction is used, by the mere movement of the lower end of the lever 14 forwardly the crank arm 52 will be actuated and the shaft 48 will be moved outwardly away from the transmission and the wheel 49 out of engagement with any of the depressions 38, 39, or 40. The numeral 54 designates a flexible element having one end connected to the outer end of the angle arm 51 and its other end connected to the clutch pedal 13. By moving the clutch pedal 13 forwardly the action and result will be identical to that caused by the forward movement of the lower end of the foot feed pedal 14. However, by the member 54 being flexible either the clutch pedal or foot feed pedal will operate independently of the other in moving the wheel 49 out of engagement with the depressions in the member 37.

The practical operation of the control is as follows: The transmission is first placed in "low" gear by pulling the handle member 27 to the rear. With the transmission in "low" gear the shaft 12 will be rotating, thereby rotating the governor shaft 29. With the governor shaft rotating, the governor will have a tendency to move the sleeve 35 away from the transmission, but this is prevented by the wheel 49 being in engagement with the depression 38 and preventing the rotation of the member 37 and shaft 23. In getting a vehicle under motion in "low" gear the upper end of the foot feed pedal 14 is pushed forwardly by the foot of the operator of the vehicle and as long as this condition exists the wheel 49 will prevent the rotation of the member 37 by the action of the governor. However, to place the transmission in "intermediate" gear it is merely necessary to release this forward pressure on the foot feed pedal, thereby bringing the lower end of the foot feed pedal into engagement with the crank arm 32. This moves the wheel 49 away from and out of engagement with the depression 38.

As the transmission has been in "low" gear the rotation of the shaft 12 will be such that the governor will partially expand, thereby sliding the sleeve 35 away from the transmission which will, through the members 45 and 46, rotate the member 37 and shaft 23 to a position where the depression 39 will be in front of the wheel 49 and the shaft 23 will place the transmission in "intermediate". By again forcing the upper end of the foot feed lever forwardly and out of engagement with the crank arm 52, the spring 50 will move the wheel 49 into engagement with the depression 39, thereby preventing any further rotation of the member 37 or shaft 23. This condition will continue until the operator lets up again on the foot feed pedal and actuates the crank arm 52. As the transmission has been in "intermediate" gear the rotation of the shaft 12 will be greater than when the transmission was in "low" gear and the tendency of the governor will be to completely expand, thereby moving the sleeve 35 completely away from the transmission and thereby rotating the member 37 and shaft 23 to positions where the depression 40 will be in front of the wheel 49 and the shaft 23 to a position where the transmission is in "high" gear. By again pressing the upper end of the carburetor foot feed pedal downwardly the wheel 49 will be permitted to enter the depression 40 and as long as the foot feed pedal is held to such a position out of engagement with the crank arm 52 the member 37 and shaft 23 will be held against rotation and the transmission definitely and positively held in "high" gear. The governor mechanism and members 45, 46, and 37 are so adjusted and arranged relative to each other that when the device is not functioning the depression 38 will be in front of the wheel 49 as shown in Fig. 3, when the transmission is in "low" gear and the vehicle motor is accelerated the depression 39, if not prevented by the wheel 49, will be in front of the wheel 49, and when the transmission is in "intermediate" gear and the vehicle motor is accelerated the depression 40, if not prevented by the wheel 49, will be in front of the wheel 49. From this, it will be seen that the governor mechanism by being connected to the shaft 12 will automatically tend to place the member 37 in proper position for the proper gear ratio from the transmission. An important feature is that the depressions 38, 39, and 40 are circular depressions and are close together so that there is no danger of the wheel 49 getting centered on the member 37 between any of the depressions. If the governor mechanism does not have any one of the depressions 38, 39, or 40 directly in front of the wheel 49, the wheel will tend to enter the depression that is the closest to it and the spring 50 will force the wheel into the depression, thereby rotating the member 37 to the proper position.

When the transmission is in "high" gear or "intermediate" gear and it is desired for the transmission to go into a lower gear it is merely necessary to release the forward pressure of the foot on the upper portion of the foot feed pedal. This results in two actions, i. e., the vehicle motor is slowed down to a minimum and the wheel 49 is moved away from the member 37. With the motor turning over slowly the governor mechanism will be correspondingly slowed down and the springs 34 will contract the governor, thereby rotating the member 37 and placing the transmission into a lower gear ratio. If the transmission were originally in "high" gear and the vehicle motor were slowed down sufficiently the member 37 will be rotated to a position where the depression 38 is in front of the wheel 49 and the shaft 23 will be in a neutral position and the transmission will be in "low" gear. By again forcing the upper end of the foot feed pedal downwardly the spring 50 will move the wheel 49 into the depression in front of it and the transmission will be definitely held in such gear ratio until the foot feed pedal is again released.

From this, it will be seen that the transmission will always be in at least "low" gear once the hand lever 27 has been pulled to the rear and that the transmission can be stepped up to "intermediate" gear or "high" gear or back from "high" gear to "intermediate" gear or "low" gear merely by the actuating of the foot feed pedal 14. Such a transmission control is almost automatic in operation and it is unnecessary to remove the hands from the steering wheel of the vehicle for the shifting of the gears as above described, thereby making my transmission control especially desirable for traffic driving. When it is desirable to put the transmission in "neutral" it is merely necessary to push the lever 27 inwardly half way. To place the transmission in "reverse" it is merely necessary to move the hand lever 27 completely forwardly. When in "reverse" it is impossible for the transmission to be placed into forward "intermediate" or "high" gear as the member 43 will be moved into engagement with the flat portion 41 and hook portion 42 of the member 37, thereby preventing its rotation so long as the transmission is in "reverse" gear.

In many instances it will be desirable to permit the transmission to go from a higher gear ratio to a lower gear ratio when the clutch pedal is depressed. This happens in traffic driving and when it is desired to completely stop the vehicle. For this reason I have provided a flexible cable 54 extending from the arm 51 to the clutch pedal. By such an arrangement it is merely necessary to push downwardly on the clutch pedal and if the vehicle is moving very slowly or is stopped, the transmission will be automatically placed in "low" gear in order that when the clutch pedal is again released the transmission will be in "low" gear for getting the vehicle again under motion.

Although I have described my invention as particularly desirable for vehicle transmissions, obviously it can be used on various other types of transmissions.

Some changes may be made in the construction and arrangement of my improved transmission control without departing from the real spirit and purpose of my invention, and it is my intention to cover by my claims any modified forms of structure or use of mechanical equivalents which may be reasonably included within their scope.

I claim:

1. In combination with a three-speed transmission having a "low" gear ratio, an "intermediate" gear ratio, a "high" gear ratio, and a "reverse" gear ratio, a control mechanism comprising a shaft operatively connected to said "low"

gear ratio and said "reverse" gear of said transmission, a manually actuatable element operatively connected to said shaft, a rotatably mounted shaft operatively connected to said "intermediate" gear ratio and said "high" gear ratio of said transmission, an element on said rotatably mounted shaft having a plurality of depressions, a slidably mounted shaft having one end capable of operatively engaging any one of said depressions in said last-mentioned element, a means for yieldingly holding said slidably mounted shaft in operative engagement with any one of said depressions in said element for the prevention of rotation of said rotatably mounted shaft, an actuatable means for sliding said slidably mounted shaft out of operative engagement with said depressions in said element at times, a governor mechanism operatively connected to said transmission, and a means for operatively connecting said governor mechanism to said element on said rotatably mounted shaft.

2. In combination with an automotive vehicle having a foot feed pedal and a transmission of "low", "intermediate" and "high" gears, a manually actuatable means for placing said transmission into or out of "low" gear, a rotatably mounted shaft operatively connected to said transmission for moving said transmission into or out of "intermediate" and "high" gear, a plate element secured to said shaft having circular depressions in its periphery, a slidably mounted shaft, a wheel on one end of said shaft capable of entering any one of said circular depressions, a spring means for yieldingly holding said wheel into engagement with any one of said circular depressions, a means for connecting said slidably mounted shaft to the foot feed pedal of said vehicle, governor mechanism operatively connected to said transmission, a movable element operatively connected to said governor mechanism capable of being moved by and relative to the speed of said governor mechanism, and a means for connecting said last-mentioned element to said plate element.

3. In combination with an automotive vehicle having a foot feed pedal, a clutch pedal, and a transmission of "low", "intermediate" and "high" gears, a manually actuatable means for placing said transmission into or out of "low" gear, a rotatably mounted shaft operatively connected to said transmission for moving said transmission into or out of "intermediate" and "high" gear, a plate element secured to said shaft having circular depressions in its periphery, a slidably mounted shaft, a wheel on one end of said shaft capable of entering any one of said circular depressions, a spring means for yieldingly holding said wheel into engagement with any one of said circular depressions, a means for connecting said slidably mounted shaft to said foot feed pedal and said clutch pedal of said vehicle, governor mechanism operatively connected to said transmission, a movable element operatively connected to said governor mechanism capable of being moved by and relative to the speed of said governor mechanism, and a means for connecting said last-mentioned element to said plate element.

4. In combination with an automotive vehicle having a foot feed pedal, a clutch pedal, and a transmission of "low", "intermediate" and "high" gears, a manually actuatable means for placing said transmission into or out of "low" gear, a rotatably mounted shaft operatively connected to said transmission for moving said transmission into or out of "intermediate" and "high" gear, a plate element secured to said shaft having circular depressions in its periphery, a slidably mounted shaft, a wheel on one end of said shaft capable of entering any one of said circular depressions, a spring means for yieldingly holding said wheel into engagement with any one of said circular depressions, a flexible means for connecting said slidably mounted shaft to the clutch pedal of said vehicle, a means for connecting said slidably mounted shaft to the foot feed pedal of said vehicle, governor mechanism operatively connected to said transmission, a movable element operatively connected to said governor mechanism capable of being moved by and relative to the speed of said governor mechanism, and a means for connecting said last-mentioned element to said plate element.

5. In combination with a multiple-speed transmission and a motor having a carburetor control element, a rotatably mounted shaft operatively connected to said transmission for moving said transmission into different gear ratios, a plate element secured to said shaft having depressions in its periphery, a wheel, a means for yieldingly holding said wheel in engagement with any one of said depressions, an actuatable means for moving said wheel out of engagement with said depressions at times, a means for connecting said last-mentioned means to said carburetor control element, a governor mechanism, a means for actuating said governor mechanism at a speed relative to the speed of said transmission, a movable element operatively connected to said governor mechanism capable of being moved by and relative to the speed of said governor mechanism, and a means for connecting said last-mentioned element to said plate element.

6. In combination with a multiple-speed transmission and a motor having a carburetor control element, a rotatably mounted shaft operatively connected to said transmission for moving said transmission into different gear ratios, a plate element secured to said shaft having depressions in its periphery, a wheel, a means for yieldingly holding said wheel in engagement with any one of said depressions, an actuatable means for moving said wheel out of engagement with said depressions at times, a means for connecting said last-mentioned means to said carburetor control element, a governor mechanism, a means for actuating said governor mechanism at a speed relative to the speed of said transmission, and a means for operatively connecting said governor mechanism to said plate element for the rotation of said plate element at times.

7. In combination with a multiple-speed transmission having a "reverse" gear, a "low" gear, an "intermediate" gear, and a "high" gear, a rotatably mounted shaft operatively connected to said transmission for placing said transmission in "low" or "reverse" gear, a second rotatably mounted shaft operatively connected to said transmission for placing said transmission in "intermediate" or "high" gear, an element on said second rotatably mounted shaft having a plurality of depressions, a slidably mounted shaft having one end capable of operatively engaging any one of said depressions in said element, a means for yieldingly holding said slidably mounted shaft in engagement with any one of said depressions in said element, an actuatable means for moving said slidably mounted shaft out of operative engagement with said depressions in said element at times, a means for operatively connecting said transmission to said second-mentioned shaft for the rotation of said shaft at times, a manually actutatable means for rotating said first-mentioned shaft, and an element on said first-mentioned shaft capable of engaging the element on said second-mentioned shaft when said first-mentioned shaft is moved to a position for placing said transmission in "reverse"; said engagement preventing the rotation of said second-mentioned shaft.

THEODORE F. THOMPSON.